(12) United States Patent
Thucanakkenpalayam Sundararajan

(10) Patent No.: US 12,147,707 B2
(45) Date of Patent: Nov. 19, 2024

(54) BUFFER CIRCUITRY FOR STORE TO LOAD FORWARDING

(71) Applicant: Synopsys, Inc., Mountain View, CA (US)

(72) Inventor: Karthik Thucanakkenpalayam Sundararajan, Fremont, CA (US)

(73) Assignee: Synopsys, Inc., Sunnyvale, CA (US)

( * ) Notice: Subject to any disclaimer, the term of this patent is extended or adjusted under 35 U.S.C. 154(b) by 70 days.

(21) Appl. No.: 17/951,528

(22) Filed: Sep. 23, 2022

(65) Prior Publication Data

US 2024/0103761 A1     Mar. 28, 2024

(51) Int. Cl.
*G06F 12/00*     (2006.01)
*G06F 3/06*     (2006.01)
*G06F 13/00*     (2006.01)

(52) U.S. Cl.
CPC .......... *G06F 3/0659* (2013.01); *G06F 3/0604* (2013.01); *G06F 3/0673* (2013.01)

(58) Field of Classification Search
CPC ..... G06F 3/0659; G06F 3/0604; G06F 3/0673
USPC .......................................................... 711/154
See application file for complete search history.

(56) References Cited

U.S. PATENT DOCUMENTS

| | | | | |
|---|---|---|---|---|
| 1,836,080 A * | 12/1931 | Mantz | ................. | E05D 13/1276 49/445 |
| 4,811,203 A * | 3/1989 | Hamstra | ............... | G06F 12/123 711/143 |
| 5,095,446 A * | 3/1992 | Jingu | ..................... | G09G 5/393 345/565 |
| 5,867,644 A * | 2/1999 | Ranson | ............... | G06F 11/3648 714/39 |
| 5,880,671 A * | 3/1999 | Ranson | ................. | G06F 11/364 714/E11.215 |
| 5,881,217 A * | 3/1999 | Ranson | ............... | G06F 9/30043 712/E9.023 |
| 5,881,224 A * | 3/1999 | Ranson | ................. | G06F 11/348 712/E9.034 |
| 5,887,003 A * | 3/1999 | Ranson | .......... | G01R 31/318566 702/186 |
| 5,956,476 A * | 9/1999 | Ranson | ............... | G06F 11/1443 714/33 |
| 5,956,477 A * | 9/1999 | Ranson | ............... | G06F 11/3466 714/E11.2 |
| 6,003,107 A * | 12/1999 | Ranson | ..................... | G06F 7/02 710/316 |
| 6,009,539 A * | 12/1999 | Ranson | ............... | G06F 11/2273 714/30 |
| 6,185,672 B1 * | 2/2001 | Trull | ..................... | G06F 9/3816 712/E9.055 |
| 6,247,114 B1 * | 6/2001 | Trull | ..................... | G06F 9/384 712/216 |

(Continued)

*Primary Examiner* — Sheng Jen Tsai
(74) *Attorney, Agent, or Firm* — Patterson + Sheridan, LLP

(57) ABSTRACT

A system and method for performing a store to load process includes receiving a first store instruction. The first store instruction includes a first target address, a first mask, and a first data structure. Further, the first target address, the first mask, and the first data structure are stored within a first store buffer location of a store buffer. A first entry identification associated with the first store buffer location is stored within an age buffer. The first data structure is output based on an order of entry identifications within the age buffer.

20 Claims, 10 Drawing Sheets

(56) References Cited

U.S. PATENT DOCUMENTS

| | | | |
|---|---|---|---|
| 6,374,370 B1* | 4/2002 | Bockhaus | G06F 11/2236 714/39 |
| 6,460,130 B1* | 10/2002 | Trull | G06F 9/3816 712/E9.055 |
| 7,517,036 B2* | 4/2009 | Walmsley | B41J 2/04505 347/57 |
| 9,304,777 B1* | 4/2016 | Schuttenberg | G06F 9/3836 |
| 9,442,735 B1* | 9/2016 | Jamil | G06F 9/3826 |
| 9,946,548 B2* | 4/2018 | Burger | G06F 9/381 |
| 10,310,873 B1* | 6/2019 | Derosa | G06F 3/067 |
| 10,528,356 B2* | 1/2020 | Chen | G06F 9/3834 |
| 11,481,332 B1* | 10/2022 | Favor | G06F 12/0864 |
| 11,841,802 B2* | 12/2023 | Favor | G06F 9/3844 |
| 11,860,794 B2* | 1/2024 | Favor | G06F 12/0895 |
| 11,868,263 B2* | 1/2024 | Favor | G06F 12/0864 |
| 11,989,561 B2* | 5/2024 | Huan | G06F 9/3856 |
| 12,073,220 B2* | 8/2024 | Favor | G06F 9/3838 |
| 2004/0174570 A1* | 9/2004 | Plunkett | H04N 1/405 358/3.13 |
| 2004/0181303 A1* | 9/2004 | Walmsley | G06F 21/554 700/121 |
| 2005/0210179 A1* | 9/2005 | Walmsley | G06F 21/445 711/3 |
| 2006/0059317 A1* | 3/2006 | Kakeda | G06F 12/0833 711/144 |
| 2006/0182118 A1* | 8/2006 | Lam | H04L 47/10 370/395.42 |
| 2007/0074005 A1* | 3/2007 | Abernathy | G06F 9/3856 712/214 |
| 2007/0288725 A1* | 12/2007 | Luick | G06F 9/3885 712/225 |
| 2007/0288726 A1* | 12/2007 | Luick | G06F 9/3834 712/216 |
| 2008/0126641 A1* | 5/2008 | Irish | G06F 13/1631 710/112 |
| 2009/0063735 A1* | 3/2009 | Ng | G06F 9/3834 710/54 |
| 2013/0103923 A1* | 4/2013 | Pan | G06F 12/1027 711/E12.059 |
| 2015/0106567 A1* | 4/2015 | Godard | G06F 12/0864 711/121 |
| 2015/0160998 A1* | 6/2015 | Anvin | G06F 12/0817 714/807 |
| 2017/0091102 A1* | 3/2017 | Wright | G06F 9/3824 |
| 2017/0371659 A1* | 12/2017 | Smith | G06F 9/30043 |
| 2017/0371660 A1* | 12/2017 | Smith | G06F 9/3005 |
| 2019/0391815 A1* | 12/2019 | McGlone | G06F 9/3851 |
| 2020/0042199 A1* | 2/2020 | Rozas | G06F 3/0619 |
| 2020/0045134 A1* | 2/2020 | Rozas | G06F 3/067 |
| 2020/0272463 A1* | 8/2020 | Bingham | G06F 9/3009 |
| 2021/0049018 A1* | 2/2021 | Silberman | G06F 9/3838 |
| 2022/0317924 A1* | 10/2022 | Shen | G06F 3/0679 |
| 2022/0317934 A1* | 10/2022 | Shen | G06F 3/0611 |
| 2022/0357955 A1* | 11/2022 | Favor | G06F 9/3834 |
| 2022/0358037 A1* | 11/2022 | Favor | G06F 12/0871 |
| 2022/0358038 A1* | 11/2022 | Favor | G06F 12/0811 |
| 2022/0358039 A1* | 11/2022 | Favor | G06F 12/0895 |
| 2022/0358040 A1* | 11/2022 | Favor | G06F 9/3861 |
| 2022/0358044 A1* | 11/2022 | Favor | G06F 12/0864 |
| 2022/0358045 A1* | 11/2022 | Favor | G06F 12/0864 |
| 2022/0358046 A1* | 11/2022 | Favor | G06F 3/0659 |
| 2022/0358047 A1* | 11/2022 | Favor | G06F 9/3858 |
| 2022/0358048 A1* | 11/2022 | Favor | G06F 12/0864 |
| 2022/0358052 A1* | 11/2022 | Favor | G06F 12/0864 |
| 2023/0342296 A1* | 10/2023 | Golla | G06F 12/0862 |

* cited by examiner

BUFFER CIRCUITRY FOR STORE TO LOAD FORWARDING

TECHNICAL FIELD

The present disclosure relates to the use of separate store and age buffers for store to load forwarding within a processing system.

BACKGROUND

Processing systems employ store to load forwarding to ensure that the data read based on a load instruction is the newest data. In one instance, a store instruction is executed, and an associated address and data is buffered. In such an instance, if a load instruction is performed after the store instruction and to the same memory address of the store instruction, the load instruction may read an old value that would have been overwritten by the preceding store instruction. Accordingly, the data obtained by the load instruction may be incorrect. To avoid loading incorrect data, a store to load forwarding process is employed. In a store to load forwarding process, the data associated with store instructions is buffered, and used to respond to load instructions for store instructions that are not-yet-retired (e.g., completed).

SUMMARY

In one example, a method includes receiving a first store instruction. The first store instruction includes a first target address, a first mask, and a first data structure. Further, the method includes storing the first target address, the first mask, and the first data structure within a first store buffer location of a store buffer. The method further includes storing a first entry identification associated with the first store buffer location within an age buffer. Further, the method includes outputting the first data structure based on an order of entry identifications within the age buffer.

In one example, a processing system includes a memory, a processor configured to access the memory via transactions, and buffer circuitry. The buffer circuitry includes a store buffer and an age buffer. The buffer circuitry receives a first store instruction. The first store instruction includes a first target address, a first mask, and a first data structure. The buffer circuitry further stores the first target address, the first mask, and the first data structure within a first store buffer location of the store buffer. Further, the buffer circuitry stores a first entry identification associated with the first store buffer location within the age buffer.

In one example, a buffer circuitry stores first target addresses, first masks, and first data structures of store instructions within buffer locations of a first buffer. Further, the buffer circuitry stores entry identifications associated with the buffer locations of the first buffer within a second buffer. The entry identifications are ordered based on an age of the store instructions. The buffer circuitry further receives a load instruction. The load instruction includes a second target address, a second mask, and a second data structure. The buffer circuitry further compares the second target address with each of the first target addresses and the second mask with each of the first masks. Further, the buffer circuitry outputs one of the first data structures based on the comparison of the second target address with each of the first target addresses and the second mask with each of the first masks.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
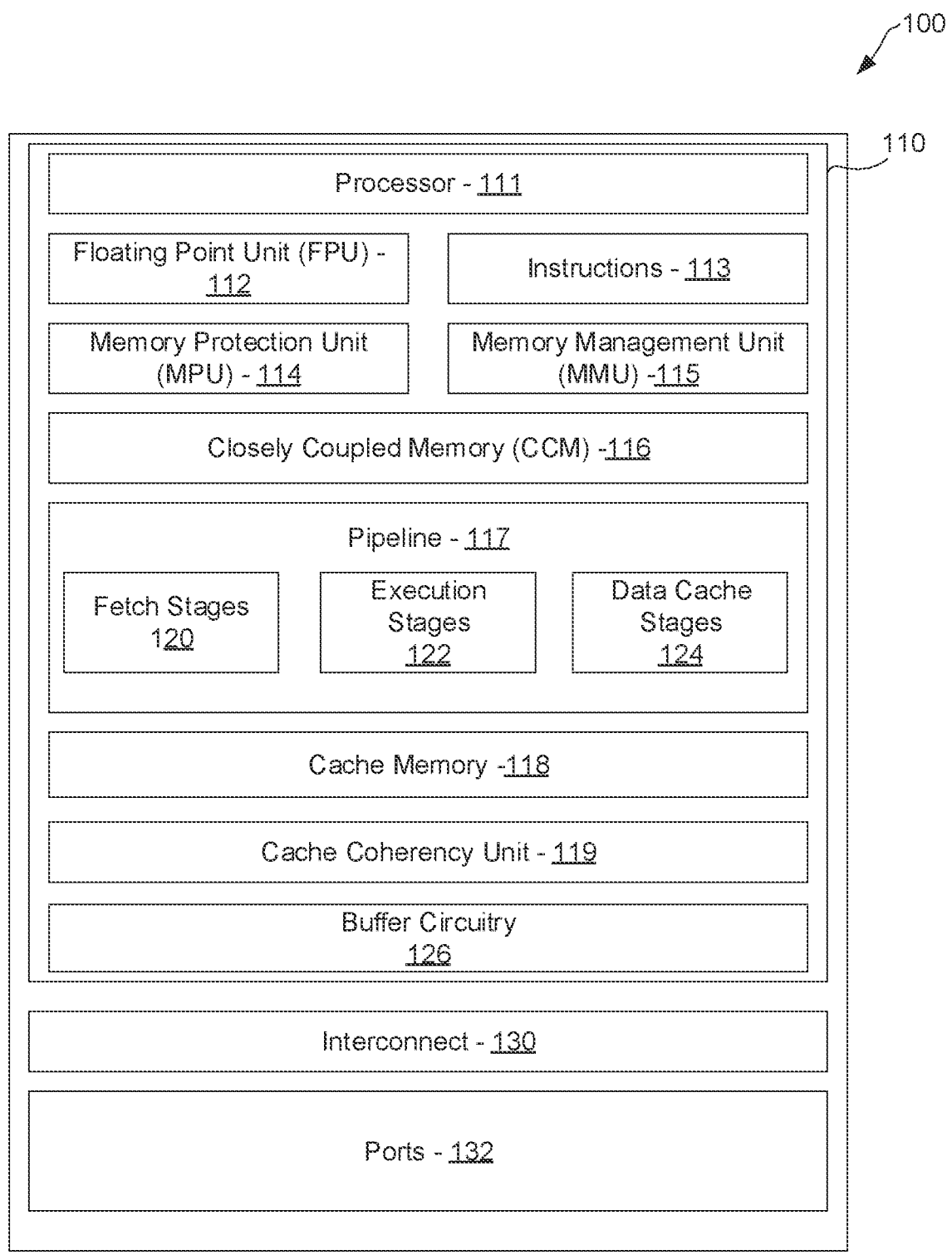
FIG. 1 illustrates an example processing system, according to one or more examples.

Aspects of the present disclosure relate to buffer circuitry for load to store forwarding. Processing systems employ a store to load forwarding process to ensure that the data (e.g., values) read by a load instruction is the newest (e.g., youngest) available data. In many instances, a store to load forwarding process employs one or more buffers to store (queue) data (e.g., address, mask information, and data structure) associated for unretired (e.g., not completed) store instructions. The address is the target address associated to where data is to be written to or read from in a memory. The mask information (e.g., mask) defines bits that are to be maintained and which bits are to be cleared. The mask information may be used to turn different bits on and off. The data structure includes that data to be written or read from the target address. In one example, if a load instruction occurs subsequent to a store instruction, before the store instruction is retired from the buffers, and has data matching that of the store instruction, the data of the store instruction stored within the buffer is used to respond to the load instruction. However, maintaining the store instructions within a buffer is a processing intensive task. For example, to ensure that the youngest available data is used to respond to a load instruction, the store instructions are sorted within the buffer based on age. The age of a store instruction corresponds to a length of time (e.g., number of processor or clock cycles) the store instruction is stored within the buffer. A store instruction may include 200 or more bits, and shifting such a large number of bits is energy (e.g., processing power) intensive.

The processing system described herein utilizes a buffer circuitry that includes a store buffer and a separate age buffer. The store buffer stores the data associated with store instructions. The age buffer stores an entry identification that is associated with each entry the store buffer. Further, the age buffer is sorted (shifted or ordered) based on an age of the store instructions. However, as compared to previous store to load forwarding architectures, the amount of data sorted by the age buffer is much smaller. For example, the entry identifications stored within the age buffer may have a size of two bits. As compared to sorting hundreds of bits, sorting two bits is a less energy (processing power) intensive task. Accordingly, the store to load forwarding architecture as described herein may be completed using a lower power processor as compared to other store to load forwarding architectures, reducing the cost of the corresponding processing system. Further, as the store to load forwarding architecture as described herein uses less processor resources as compared to other store to load forwarding architectures, additional processing resources are freed up to be used for other tasks, improving the efficiency of the corresponding processing system.

Technical advantages of the present disclosure include, but are not limited to using an age buffer to track the relative ages of store instructions, as well as a store buffer to store the data associated with the store instructions. The entries to the age buffers are pointers to the entries within the store buffer. Accordingly, the size of the entries in the age buffer is smaller than the data stored in the store buffer, and sorting the entries in the age buffer based on relative age uses less processing power than that of sorting the data within the store buffer.

FIG. 1 illustrates a processing system 100, according to one or more examples. The processing system 100 includes one or more integrated circuit (IC) chips. In one example, the processing system 100 includes one or more field programmable gate arrays (FPGAs) and/or application specific ICs (ASICS), among others. In one example, the processing system 100 is a system on chip (SoC).

The processing system 100 includes a core 110. In one example, the processing system 100 includes two or more cores 110. The core 110 includes processor 111. In one example, the processor 111 is a central processing unit (CPU). In another example, the processor 111 is a 32-bit or a 64-bit reduced instruction set computer (RISC) processor. In other examples, other types of processors may be used. The processor 111 may be configured similar to the processing system 1002 of FIG. 10.

The core 110 further includes a floating point unit (FPU) circuitry 112. The FPU circuitry 112 performs one or more operations on floating point numbers. For example, the FPU circuitry 112 performs one or more of addition, subtraction, multiplication, division, and/or square root operations, among others.

Further, the core 110 includes instructions 113. The instructions 113 correspond to one or more applications to be performed by the processor 111. In one example, the instructions 113 include transaction control statements configured to be performed by the processor 111.

The core 110 includes a memory protection unit (MPU) circuitry 114. The MPU circuitry 114 performs memory protection functions. For example, the MPU circuitry 114 performs memory protection functions for a cache memory (e.g., the cache memory 118). The MPU circuitry 114 monitors transactions, including instruction fetches and data accesses from the processor 111. The MPU circuitry 114 detects access violations and triggers fault exceptions.

The core 110 includes a memory management unit (MMU) circuitry 115. The MMU circuitry 115 handles memory requests made by the processor 111. In one example, the MMU circuitry 115 performs translations of virtual memory addresses to physical addresses. Further, the MMU circuitry 115 controls transactions provided to a cache memory (e.g., the cache memory 118), bus arbitration and/or memory bank switching.

The core 110 includes closely coupled memory (CCM) 116. The CCM 116 is mapped into a physical memory space and has a base address that is configurable. The CCM 116 has a direct memory interface that provides burst read and write memory operations for the processor 111. In one example, the CCM 116 is a random access memory (RAM). Further, the CCM 116 may be an instruction CCM for code instruction references and/or a data CCM for data references.

The core includes 110 includes pipeline 117. The pipeline 117 receives and processes instructions in a pipelined fashion. The pipeline 117 includes one or more stages. In one or more examples, the stages of the pipeline include a series of sequential steps performed by different portions of the core.

In one example, the pipeline 117 includes fetch stages 120, execution stages 122, and data cache stages 124. The fetch stages 120 fetch (obtain) instructions (e.g., memory access instructions) from a memory (e.g., the cache memory 118). Further the fetch stages 120 decode the instructions, and fetch the source operands (e.g., read registers associated with the instructions while decoding the instruction). The execution stages 122 perform an operation specified by the decoded instructions. In one example, the execution stages 122 additionally or alternatively, calculate an address. Further, the execution stages 122 perform one or more store functions associated with the instructions. During the execution stages 122, information corresponding to results (e.g., store instructions) are stored within buffer circuitry 126 of the core 110. The buffer circuitry 126 includes one or more buffers. The buffers may include one or more buffer locations that can be used to store information related to store commands and/or load commands.

The data cache stages 124 access a data cache memory (e.g., the cache memory 118). In one example, the data cache stages 124 access the data cache memory to perform one or more load functions associated with the instructions. In one example, the MMU circuitry 115 controls the loading of transactions into the data cache stages 124.

The core 110 further includes a cache memory 118. The cache memory 118 is one or more of an instruction cache memory and a data cache memory. The cache memory 118 may be a level one cache memory. In one example, the cache memory 118 is shared among multiple different cores.

The core 110 includes a cache coherency unit 119. The cache coherency unit 119 provides input/output coherency between the cache memory 118 and the processor 111. In one example, the cache coherency unit 119 includes an interconnect and controller to ensure consistency of shared data within the cache memory 118.

In one example, the processing system 100 further includes interconnect 130. The interconnect 130 is connected to the core 110 and the ports 132. The interconnect 130 includes one or more connections and/or one or more switches that connect the core 110 with the ports 132. The interconnect 130 may be a programmable interconnect or a non-programmable (e.g., hard-wired) interconnect. The ports 132 provide a communication pathway with devices external to the processing system 100.

Figure 2:
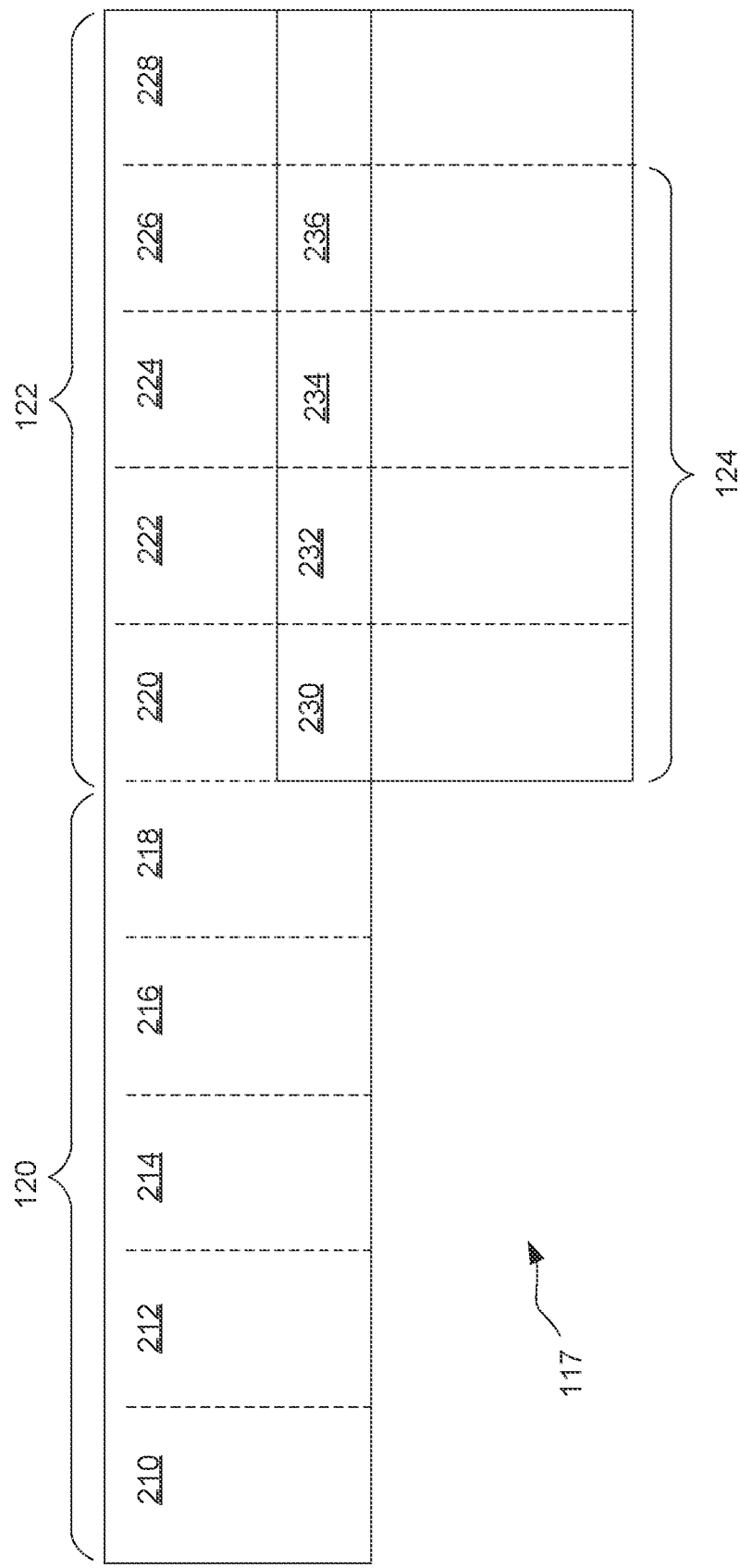
FIG. 2 illustrates a pipeline of an example processing system, according to one or more examples.

FIG. 2 illustrates an example of the pipeline 117. As illustrated in FIG. 2, the pipeline 117 is a ten stage pipeline. In other examples, the pipeline 117 may include more or less than ten stages. The fetch stages 120 includes stages 210-218. The stages 210-218 occur subsequent to each other. In one example, during the stage 210 (e.g., a first fetch stage)

the CCM 116 is read by the processor 111 to obtain a memory access instruction (e.g., a store instruction or a load instruction). Further during the stage 210, branch prediction is performed. Branch prediction includes predicting the direction of a branch of a branching instruction before the direction is definitively known. Branch prediction is performed by branch prediction circuitry (not shown) of the core 110.

During stage 212 the packets of the memory access instruction are stored by the processor 111 within a fetch buffer (not shown) of the core 110. In one example, the fetch buffer is part of the processor 111. Further, at stage 212, hit detection is performed by the processor 111. For examples, during stage 212, a fetch request to the CCM 116 is made for the address of a branch of a branching instruction. If the target address is found in a first level of the CCM 116, a hit occurs (e.g., a hit is detected). If the target address is not found in a first level of the CCM 116, the subsequent levels of the CCM 116 are searched to find a hit.

The stage 214 is an alignment stage. During the alignment stage, a fixed number of aligned bytes are read from the CCM 116 and stored in a register by the processor 111. The aligned bytes are aligned on even address for half-word alignment or on addresses that are a multiple of four for full word alignment.

The stages 216 and 218 are decode stages. During the stage 216, instructions from the fetch buffer are decoded by the processor 111, and resources for the instructions are allocated by the processor 111. During the stage 218, the source operands associated with the instructions are located and stored in a register by the processor 111.

The execution stages 122 include stages 220-228. The stages 220-228 occur subsequent one another, and subsequent to the fetch stages 120. At the stage 220, an arithmetic logic unit (ALU) operation is performed on the operands stored within the register during stage 222. During the stage 220, the ALU of the processor 111 obtains the operands from the register and performs an operation associated with the operands.

At stage 222, mispredicted branches are detected. For example, at stage 222, the processor 111 determines whether or not the branch prediction performed at stage 210 was correct or not correct (e.g., mispredicted). If a misprediction is detected, the pipeline 117 is flushed, and/or the processor 111 is directed to the correct target by the branch prediction circuitry.

At stage 224 operand bypassing (or forwarding) is performed. For example, operand bypass circuitry within the processor 111 minimizes data dependency stalls within the pipeline by storing an intermediate value or values received from the stage 222 and providing the intermediate value to the ALU operation of the stage 226. In one example, two instructions may interfere with each other due to a flow (data) dependence between the instructions, an anti-dependence between the instructions, and/or an output dependence between the instructions. Using the operand bypass circuitry mitigates interference between the instructions by allowing a dependent instruction access to a new value produced by another instruction directly.

At the stage 226, an ALU operation is performed on the operands stored within the operand bypass circuitry. The stage 226 may be referred to as a commit stage. During the stage 226, ALU circuitry of the processor 111 obtains the operands from the operand bypass circuitry and performs an operation associated with the operands. The output (e.g., results) of the ALU circuitry may be referred to as store instructions. The store instructions are stored in the buffer circuitry 126 by the processor 111. Further, during stage 226 exceptions and/or interrupts are handled by the processor 111. The exceptions and/or interrupts may be caused by a misaligned memory action, protection violation, page fault, undefined operand code, arithmetic overflow, and misaligned memory access protection, among others. In one example, the output of the ALU operation (e.g., the result) is flushed (or dumped) if an exception (e.g., a page fault) is detected.

The stage 228 is a writeback stage. During the stage 228, the processor 111 writes the output (e.g., the store instructions) of the ALU operation at stage 226 to the memory 118.

The data cache stages 124 include the stages 230-236. The stages 230-236 occur subsequent to each other and subsequent to the stage 218. Further, the stages 230-236 occur in parallel (e.g., during an al least partially overlapping time) with the stages 220-226. In one example, the stage 220 is performed in parallel with the stage 230, the stage 222 is performed in parallel with the stage 232, the stage 224 is performed in parallel with the stage 234, and the stage 226 is performed in parallel with the stage 236.

At stage 230, the source operands associated with the instructions are obtained from the register. For example, the processor 111 obtains the source operands from the register. At the stages 232 and 234, the cache memory 118 is accessed to determine if the target address of the memory access instruction is available. At stage 236, if the target address is determined to be available by the processor 111, an address hit is detected at a first level of the cache memory 118. If not, subsequent levels of the cache memory 118 are searched until a hit on the target address is determined. In one example at the stage 228, the load buffer of the memory 118 is written based on the data of the memory access instruction.

Figure 3:
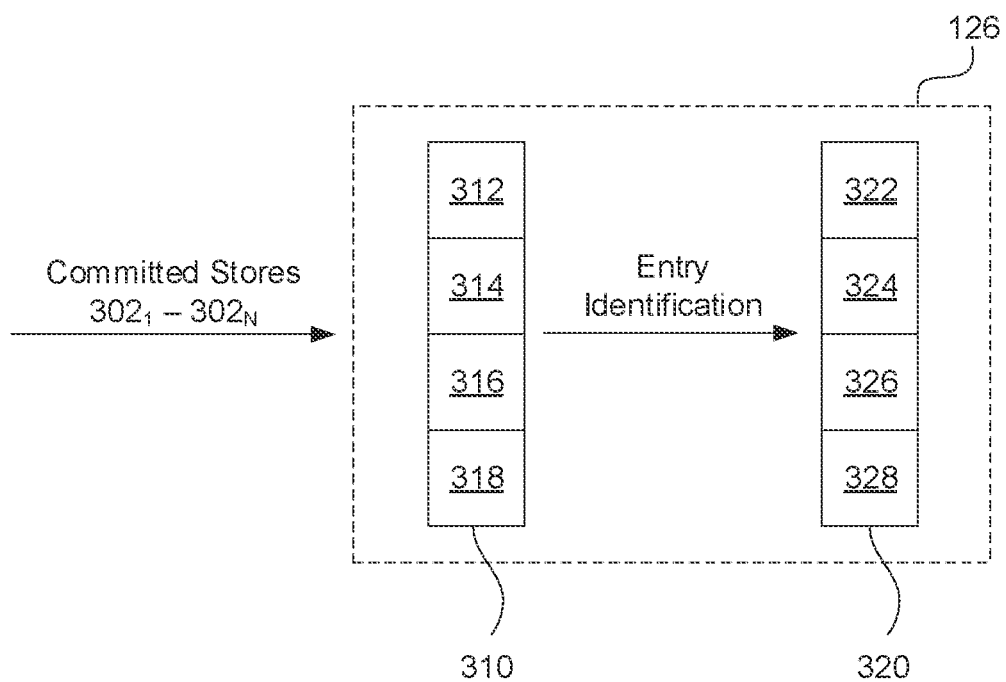
FIG. 3 illustrates a store buffer and an age buffer of buffer circuitry, according to one or more examples.

The store instructions are stored in the buffer circuitry 126. The store instructions may be committed stores stored at stage 226 of the pipeline 117. In other examples, the store instructions are stored in the buffer circuitry 126 before the committed stores are generated. For example, the store instructions may be stored during other stages of the pipeline 117. The buffer circuitry 126 is used by the processor 111 in a store to load forwarding process. FIG. 3 illustrates a schematic diagram of a portion of the buffer circuitry 126. As illustrated in FIG. 3, the buffer circuitry 126 includes a store buffer 310 and an age buffer 320. The store buffer 310 includes four buffer locations, buffer locations 312-318. In other examples, the store buffer 310 may include more than or less than four buffer locations.

In one example, the store instructions 302 are received from the ALU circuitry used during the stage 226. In one example, the store instructions 302 are committed stores. In other examples, the store instructions 302 are received before committed stores are generated. The store instructions 302 are associated with respective store instructions. In one example, a first store instruction is received by the store buffer 310. For example, the store instruction $302_1$ is received by the store buffer 310. The store instruction $302_1$ is stored within a first buffer location of the store buffer 310. In one example, data associated with the store instruction $302_1$ is stored within a first entry of the store buffer 310. The data associated with the store instruction $302_1$ includes a target address, mask information (size information), and a data structure. In one or more examples, storing the store instruction $302_1$ in an buffer location of the store buffer 310 includes determining a free (empty) buffer location within the store buffer 310, and storing the store instruction $302_1$ within the detected an available (e.g., free or empty) buffer location. For example, the processor 111 determines that the buffer locations 312, 316, and 318 include data corresponding to a store instruction, and that the buffer location 314 is available. Accordingly, the processor 111 stores the data associated with the store instruction in the buffer location 314 of the store buffer 310.

The age buffer 320 includes four buffer locations, buffer locations 322-328. In other examples, the age buffer 320 includes more than or less than four buffer locations. In one example, the age buffer 320 includes at least as many buffer locations as the store buffer 310. For each store instruction 302 stored in the store buffer 310, the processor 111 stores an entry identification (e.g., pointer) within the buffer 320. In view of the example above, the processor 111 stores an entry identification indicating that the store instruction 302 is stored within the buffer location 314.

Each of the buffer locations 312-318 is associated with a respective entry identification. The entry identification is stored within the buffer locations 322-328 and functions as a pointer that can be used to reference the buffer locations 312-318. Based on storing data associated with a store instruction within one of the buffer locations 312-318, the respective entry identification is stored within the next available one of the buffer locations 322-328. The next available buffer location 322-328 is an available buffer location 322-328 that is adjacent to a non-available buffer location 322-328.

The data stored within the buffer locations 312-318, and the entry identifications within the buffer locations 322-328 is retired (e.g., emptied) based on the store instructions being completed (e.g., written to memory) during stage 228 of the pipeline 117. In one or more examples, the retiring the data and a corresponding entry identification occurs a number of clock cycles after a corresponding store instruction is completed. In one example, retiring the data stored within the buffer locations 312-318 includes deleting the data from corresponding buffer location. Further, retiring an entry identification from the buffer locations 322-328 includes deleting the entry identification from a corresponding buffer locations. When data is retired from one of the buffer locations 312-318, the data in the buffer locations 312-318 is not reordered or adjusted. However, when the entry identification is retired from one of the buffer locations 322-328, the remaining entry identifications within the buffer locations 322-328 are reordered (e.g., shifted or sorted) such that entry identifications are sequentially arranged based on a relative age within the buffer locations 322-328. For example, the remaining entry identifications with the buffer locations 322-328 are reordered such that an oldest entry identification is stored within the buffer location 322, and a youngest entry is stored in buffer location 326. In another example, the remaining entry identifications with the buffer locations 322-328 are reordered such that an oldest entry is stored within the buffer location 328, and a youngest entry is stored in buffer location 324.

Reordering (e.g., shifting) the entry identifications of the buffer locations 322-328 of the age buffer 320 uses less processor resources than reordering the entries of the buffer locations 312-318 of the store buffer 310, as the entry identification stored within the entries of the buffer location 322 is smaller in size than the data stored within the buffer locations 322-328. In one example, the size of the entry identification is two bits as compared to sixteen or more bits of the data stored in the buffer locations 312-318 of the store buffer 310. Accordingly, shifting the data associated with the entry identifications stored in the buffer locations 322-328 of the age buffer 320 uses less processor resources (e.g., processing power) as compared to reordering the data stored in the buffer locations 312-318 of the store buffer 310.

Figure 4:
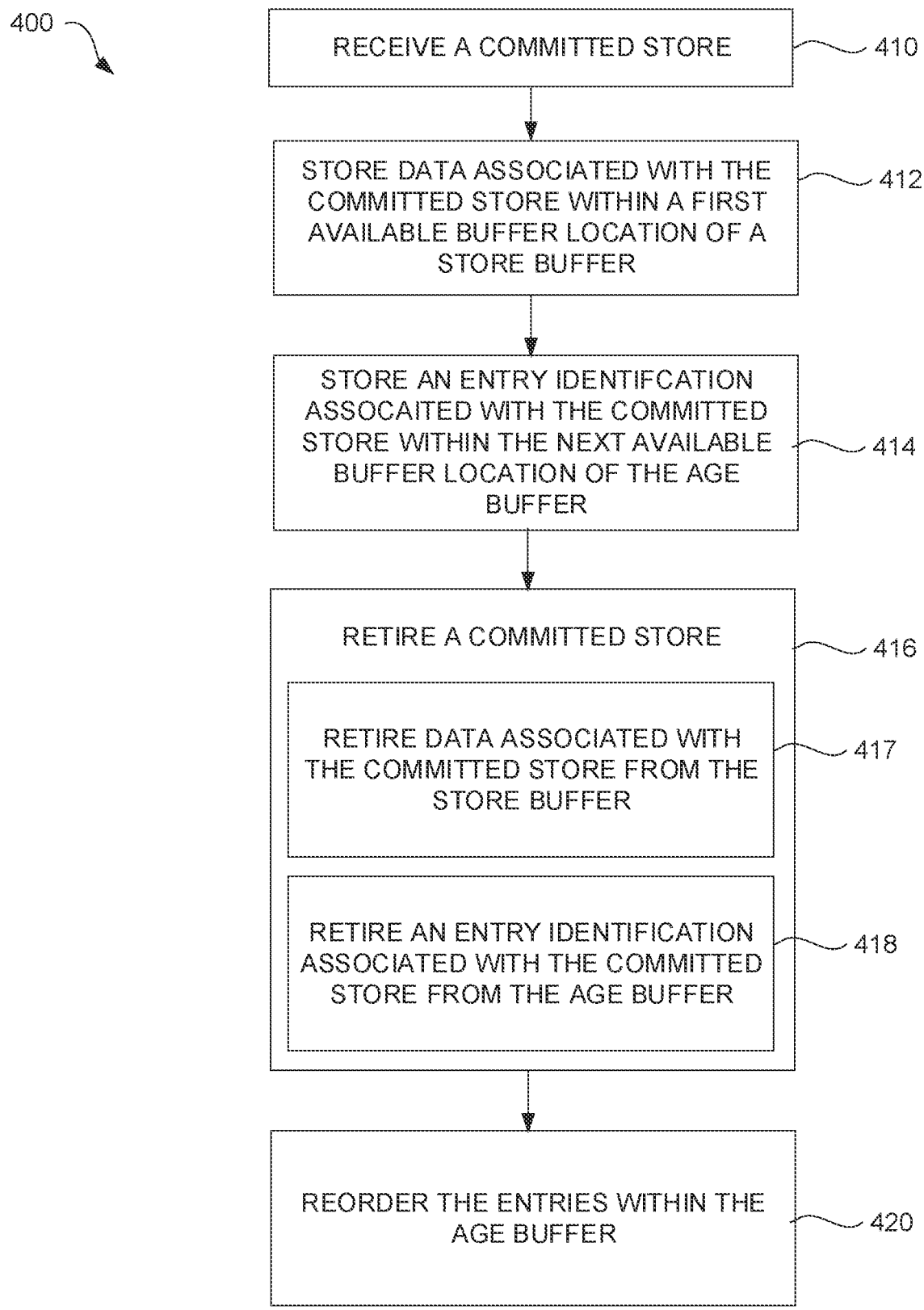
FIG. 4 is a flowchart of a method for interacting with the buffer circuitry, according to one or more examples.

FIG. 4 illustrates a flowchart of a method 400 for storing store instructions 302 within the buffer circuitry 126 as part of a store to load forwarding process. The method 400 is performed by the processor 111. The method 400 may be performed before, during, or after stage 224 of the pipeline 117. The method 400 is described with regard to the elements of FIGS. 1-3.

At 410 of the method 400, a store instruction is received. For example, with reference to FIG. 3, a store instruction $302_1$ is received by the buffer circuitry 126. At 412, data associated with the store instruction is stored within a first available buffer location of a store buffer of the buffer circuitry 126. For example, with reference to FIG. 3, the processor 111 determines an available buffer location of the buffer locations 312-318 of the store buffer 310. As the data within the buffer locations 312-318 is not reordered, the next available buffer location of the buffer locations 312-318 is any available (e.g., empty or free) one of the buffer locations 312-318. The processor 111 stores the data associated with the store instruction $302_1$ within the available buffer. In one example, the processor 111 determines that the buffer location 314 is available and stores the data associated with the store instruction $302_1$ within the buffer location 314. The data associated with the store instruction $302_1$ includes a target address, mask information, and a data structure. The data structure includes the values to be written to the target address.

At 414 of the method 400, an entry identification associated with the store instruction is stored within the next available buffer location of the age buffer. In one example, with reference to FIG. 3, the processor 111 determines an entry identification for the store instruction $302_1$. The entry identification indicates which of the buffer locations 312-318 the data associated with the store instruction $302_1$ is stored. Each of the buffer locations 312-318 is associated with a different entry identification. For example, the buffer location 312 is associated with the entry identification '00', the buffer location 314 is associated with the entry identification '01', the buffer location 316 is associated with the entry identification '10', and the buffer location 318 is associated with the entry identification '11'. In one example, the processor 111 determines that the data associated with the store instruction $302_1$ is determined to be stored within the buffer location 314, which is associated with the entry identification '01'. The entry identification '01' is stored in the next available one of the buffer locations 322-328.

In one example, entries within the buffer locations 322-328 are sorted based on the age of the data (e.g., entry identifications) stored within the buffer locations 322-328. For example, an oldest entry identification is stored in the buffer location 322 or 328, with the other entry identifications being sorted within the other buffer locations based on a corresponding age, going from oldest to youngest.

In an example where the entries are sorted such that an oldest entry is stored in the buffer location 322, the next available buffer location is next empty one of the buffer locations 324-328. Further, in an example where the entries are sorted such that an oldest entry is stored in the buffer location 328, the next available buffer location is next empty one of the buffer locations 326-322. In one example, the oldest entry is stored in the buffer location 322 and the next oldest entry is stored in the buffer location 324. In such an example, the buffer locations 326 and 328 are empty (e.g., available). Further, as the entries are sorted within the buffer locations 322-328 in a descending manner, the next available buffer location is 326. In an example where the oldest entry is stored in the buffer location 328 and the next oldest entry is stored in the buffer location 326. In such an example, the buffer locations 324 and 322 are empty (e.g., available). Further, as the entries are sorted within the buffer locations 322-328 in an ascending manner starting with the buffer location 328, the next available buffer location is 324.

The processor 111 stores the entry identification associated with the store instruction $302_1$ in the next available buffer location of the buffer locations 322-328.

At 416 of the method 400, a store instruction is retired. For example, a store instruction is a committed store that is completed via a writeback stage (e.g., the writeback stage 228 of FIG. 2). In one example, retiring a store instruction includes retiring (e.g., deleting) data associated with the store instruction from the store buffer (e.g., 417 of the method 400). For example, the processor 111 determines that the store instruction $302_1$ has been completed, and retires the data associated with the store instruction $302_1$ in the buffer location 314 during one or more subsequent clock (e.g., processing) cycles. At 418 of the method 400, retiring a store instruction includes retiring (e.g., deleting) the entry identification associated with the store instruction from the age buffer 320. For example, the processor 111 determines that the store instruction $302_1$ has been completed and retired, and retires the entry identification associated with the store instruction $302_1$ in the buffer location 324.

At 420 of the method 400, the entries within the age buffer are reordered. For example, the processor 111 reorders the entries within the buffer locations of the age buffer. In one example, based on retiring an entry identification associated with a retired store instruction from the age buffer 320, the processor 111 reorders the entries within the age buffer 320. In one example, reordering the entries within the buffer locations 322-328 of the age buffer 320, sorts the entries (e.g., entry information) based on the corresponding ages. Sorting the entries sequentially orders the entries based on their corresponding ages without any empty buffer locations between the entries.

In one example, the entries within the store buffer 310 are not reordered as entries within the buffer locations 312-318 are retired. Accordingly, an empty one of the buffer locations 312-318 may be located between two unavailable buffer locations 312-318 (e.g., buffer locations that include data). Further, the order of the stored entries within the buffer locations 312-318 is not age dependent.

Figure 5:
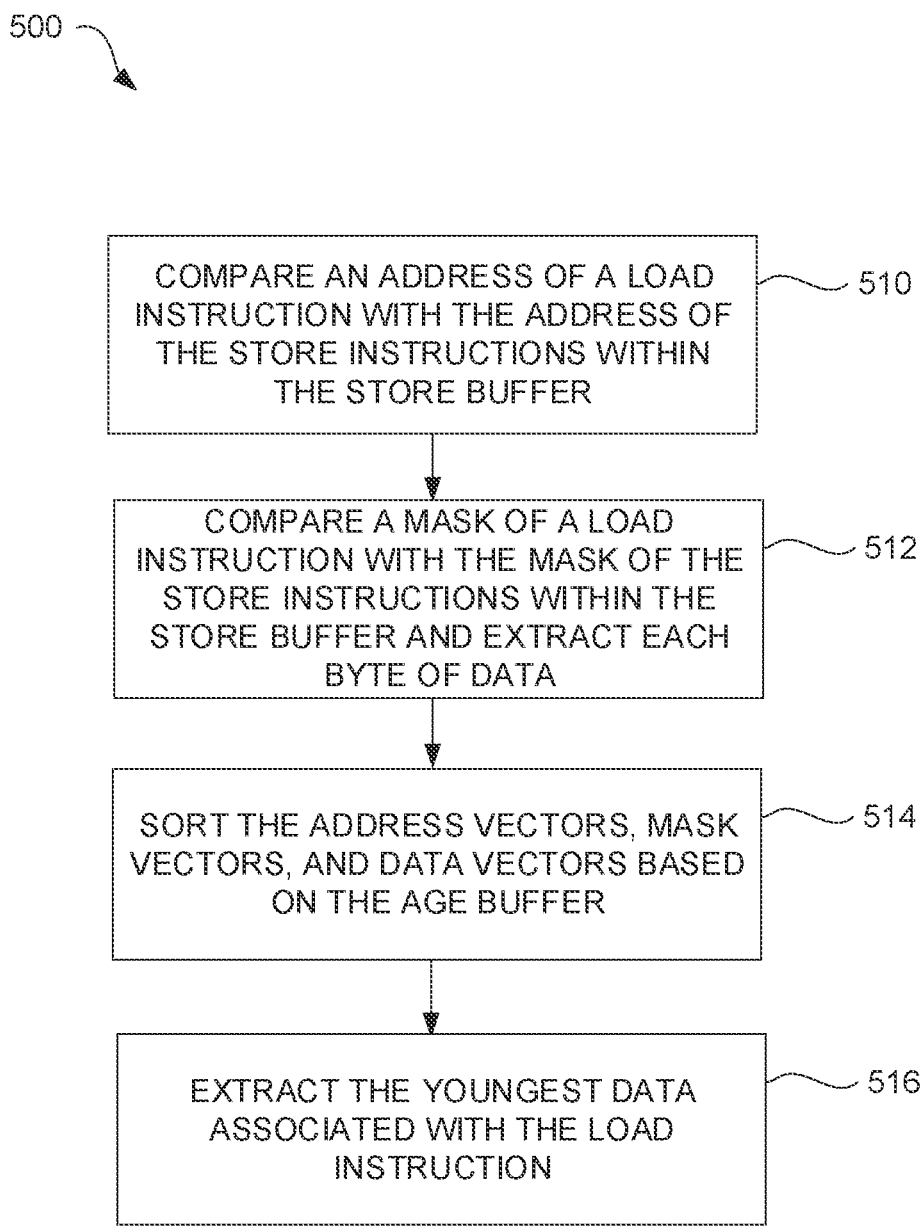
FIG. 5 is a flowchart of a method for performing a store to load forwarding process, according to one or more examples.

In one or more examples, when performing a load instruction, the processor 111 performs a store to load forwarding process based on the data stored within the store buffer 310 and the age buffer 320. For example, the processor 111 attempts to find a match between the load instruction and the data stored within the store buffer 310 to determine whether or not the data within the store buffer 310 can be used to respond to the load instruction. During the matching processes, the data within the age buffer 320 is used to ensure that the youngest (newest) data is selected to respond to the load instruction. FIG. 5 illustrates a flowchart of a method 500 for determining a match between a load instruction and one or more store instructions for a store to load forwarding process. The method 500 is performed by the processor 111 by executing instructions stored within a memory. Further, the method 500 is described with regard to FIGS. 3, 6, 7, 8, and 9. The method 500 may be performed before, during, or after the stage 224 of the pipeline 117.

At 510 of the method 500, the address of a load instruction is compared with the address of the store commands within the store buffer. For example, with reference to FIG. 6, the processor 111 compares the address of the load instruction 602 to the address within each of the buffer locations 312, 314, 316, and 318 of the store buffer 310 to determine the vector (address vector) 610. The processor 111 may include one or more comparators that compare the address of the load instruction 602 with the entry of each buffer location 312, 314, 316, and 308. Each entry within the locations 612-618 of the vector 610 indicates whether or not a match was found between the address of the load instruction 602 with the address within a respective one of the buffer locations 312, 314, 316, and 318. Each of the locations 612-618 store a one bit value indicating whether or not a match is found. In one example, the processor 111 compares the address of the load instruction 602 to the address of the buffer location 312, and updates the vector location 612 with an indication as to whether or not a match was found. If a match is found, the vector location 612 is updated with a value of '1' (or another value or indication). If a match is not found, the location is updated with a value of '0' (or another value or indication). Further, the processor 111 compares the address of the load instruction 602 to the address of the buffer location 314, and updates the vector location 614 with an indication as to whether or not a match was found. The processor 111 compares the address of the load instruction 602 to the address of the buffer location 316, and updates the vector location 616 with an indication as to whether or not a match was found. The processor 111 compares the address of the load instruction 602 to the address of the buffer location 318, and updates the vector location 618 with an indication as to whether or not a match was found. The address of the load instruction 602 may match one or more of the address within the buffer locations 312-318. The vector 610 is stored within cache memory 118, the buffer circuitry 126, or another memory within or connected to the processing system 100.

At 512 of the method 500, the mask of a load instruction is compared with the mask of the store commands within the store buffer. For example, with reference to FIG. 7, the processor 111 compares the mask (e.g., size information) of the command 602 to the mask within each of the buffer locations 312, 314, 316, and 318 of the store buffer 310 to determine the vectors 710 (e.g., mask vectors). The comparison is completed on a byte per byte basis of the masks. Further, the data within each of the buffer locations 312-316 is output to a respective vector location within the vectors 720 on a byte by byte process. In one or more examples, each entry within the vector locations 712-718 of the vectors 710 indicate whether or not a match was found between the respective byte of the mask of a load instruction 602 with the corresponding byte of the within each of the buffer locations 312, 314, 316, and 318. Each of the locations 712-716 store a one bit indication as to whether or not a match was found. For example, a value of "1" indicates a match was made and a value of "0" indicates a match was not made. In other examples, other values may be used to indicate whether or not a match was made. Further, the number of bits used store whether or not a match was made may be greater than one. In one example, a first byte (byte 0) of the mask of the load instruction 602 is compared to a first byte (e.g., byte 0) of each of the buffer locations 312, 314, 316, and 318. The locations $712_1$, $714_1$, $716_1$, and $718_1$ of the vector $710_1$ are updated accordingly to indicate whether or not a match was found. The comparison is completed for each of the bytes within the mask of the load instruction 602 to update a corresponding one of the vectors $710_1$-$710_N$. N is equal to the number of bytes within the mask of the load instruction 602. N is greater than 1. In one example, for a two byte mask, N is equal to two. Each byte within the mask of the load instruction 602 is associated with a corresponding one of the vectors 710. The vectors 710 are stored within the cache memory 118, within buffers of the buffer circuitry 126, or another memory of the processing system 100.

Further, during 512 of the method 500, the data stored within each of the buffer locations 312-318 is output on a byte per byte basis to a respective vector location in a respective one of the vectors 720. For example, byte 0 of the data structure within buffer location 312 is stored within the vector location $722_1$ of the vector $720_1$, byte 0 of the data structure within buffer location 314 is stored within the vector location $724_1$ of the vector $720_1$, byte 0 of the data structure within buffer location 316 is stored within the vector location $726_1$ of the vector $720_1$, and byte 0 of the data structure within buffer location 318 is stored within the vector location $728_1$ of the vector $720_1$. Further, byte N of the data structure within buffer location 312 is stored within the vector location $722_N$ of the vector $720_N$, byte N of the data structure within buffer location 314 is stored within the vector location $724_N$ of the vector $720_N$, byte N of the data structure within buffer location 316 is stored within the vector location $726_N$ of the vector $720_N$, and byte N of the data structure within buffer location 318 is stored within the vector location $728_N$ of the vector $720_N$. As is noted above, N is greater than 1. In one example, the bytes of the data structure are output into the vectors 720 during a period that at least partially overlaps with a period during which the bytes of the mask are compared and the vectors 710 are updated. The vectors 720 are stored within the cache memory 118, within buffers of the buffer circuitry 126, or another memory of the processing system 100.

In one example, the data structure within the buffer locations 312-318 are 320 bits of the form 0xAABB_FFCC. In such an example, byte 0 of the data structure is associated with CC, byte 1 of the data structure is associated with FF, byte 2 of the data structure is associated with BB, and byte 3 of the data structure is associated with AA. In such an example, the data associated with byte CC of buffer location 312 is stored in vector location $722_1$ of vector $720_1$, the data associated with byte CC of buffer location 314 is stored in vector location $724_1$ of vector $720_1$, the data associated with byte CC of buffer location 316 is stored in vector location $726_1$ of vector $720_1$, and the data associated with byte CC of buffer location 318 is stored in vector location $728_1$ of vector $720_1$. The data associated with byte FF of buffer location 312 is stored in vector location $722_2$ of vector $720_2$, the data associated with byte FF of buffer location 314 is stored in vector location $724_2$ of vector $720_2$, the data associated with byte FF of buffer location 316 is stored in vector location $726_2$ of vector $720_2$, and the data associated with byte BB of buffer location 318 is stored in vector location $728_3$ of vector $720_3$. The data associated with byte BB of buffer location 312 is stored in vector location $722_3$ of vector $720_3$, the data associated with byte BB of buffer location 314 is stored in vector location $724_3$ of vector $720_3$, the data associated with byte BB of buffer location 316 is stored in vector location $726_3$ of vector $720_3$, and the data associated with byte BB of buffer location 318 is stored in vector location $728_3$ of vector $720_3$. The data associated with byte AA of buffer location 312 is stored in vector location $722_4$ of vector $720_4$, the data associated with byte AA of buffer location 314 is stored in vector location $724_4$ of vector $720_4$, the data associated with byte AA of buffer location 316 is stored in vector location $726_4$ of vector $720_4$, and the data associated with byte AA of buffer location 318 is stored in vector location $728_4$ of vector $720_4$.

Figure 8:
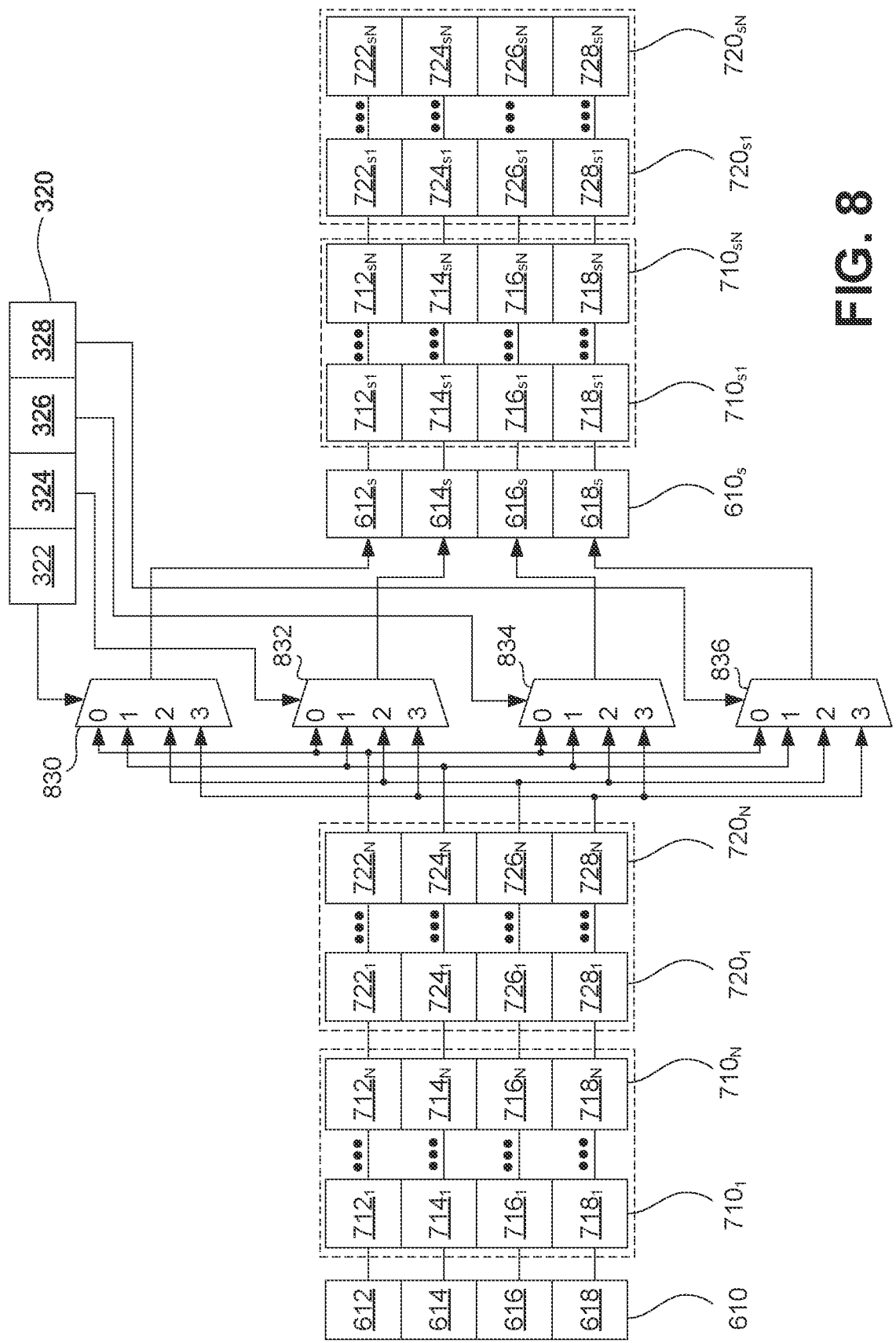
FIG. 8 illustrates the sorting of address vectors and match vectors of buffer circuitry, according to one or more examples.

At 514 of the method 500, the address vector, the mask vectors, and the data vectors are sorted based on the age buffer. For example, the address vector 610 of FIG. 6, the mask vectors 710 of FIG. 7, and the data vectors 720 of FIG. 7are arranged in age order based on the entries in an age buffer (e.g., the age buffer 320 of FIG. 3). FIG. 8 illustrates example circuitry for sorting the address vector 610, the mask vectors 710, and the data vectors 720 based on the age buffer 320. In FIG. 8, the sorted vector $610_s$, the sorted vectors $710_s$, and the sorted vectors $720_s$ are generated. In one example, an entry from a respective vector location in each of the vectors 610, 710, and 720 are provided to a corresponding input of the multiplexers 830, 832, 834, and 836. The multiplexers 830, 832, 834, and 836 are part of the of the buffer circuitry 126.

Each multiplexer 830, 832, 834, and 836 includes four inputs. For examples, each of the multiplexers 830, 832, 834, and 836 includes input 0, input 1, input 2, and input 3. In one example, the 0 input of each multiplexer 830, 832, 834, and 836 receives an input based on the entries of the vector locations 612, $712_1$-$712_N$, and $722_1$-$722_N$. In one example, the entries within the vector locations 612, $712_1$-$712_N$, and $722_1$-$722_N$ are combined (e.g., encoded or combined in another way) by the processor 111 and/or the buffer circuitry 126 to generate a first combined signal. The first combined signal is output the input 0 of each multiplexer 830, 832, 834, and 836. The entries within the vector locations 614, $714_1$-$714_N$, and $724_1$-$724_N$ are combined (e.g., encoded or combined in another way) by the processor 111 and/or the buffer circuitry 126 to generate a second combined signal. The second combined signal is output the input 1 of each multiplexer 830, 832, 834, and 836. The entries within the vector locations 616, $716_1$-$716_N$, and $726_1$-$726_N$ are combined (e.g., encoded or combined in another way) by the processor 111 and/or the buffer circuitry 126 to generate a third combined signal. The third combined signal is output input 2 of each multiplexer 830, 832, 834, and 836. The entries within the vector locations 618, $718_1$-$718_N$, and $728_1$-$728_N$ are combined (e.g., encoded or combined in another way) by the processor 111 and/or the buffer circuitry 126 to generate a third combined signal. The third combined signal is output input 3 of each multiplexer 830, 832, 834, and 836.

The multiplexers 830, 832, 834, and 836 receive control signals from the age buffer 320. As is noted above, the buffer locations 322, 324, 326, and 328 of the age buffer 320 are sorted based on the age of the entries within the age buffer 320. For example, the entry within the buffer location 322 is younger (e.g., newer) than that of the buffer locations 324, 326 and 328. In the example of FIG. 8, the relative age of the entries with the buffer locations 322, 324, 326, and 328 increases from buffer location 322 to buffer location 328. In other examples, the relative age of the entries with the buffer locations 322, 324, 326, and 328 decreases from buffer location 322 to buffer location 328.

In one example, the multiplexer 830 receives a control signal from the buffer location 322, the multiplexer 832 receives a control signal from the buffer location 324, the multiplexer 834 receives a control signal from the buffer location 326, and the buffer location 826 receives a control signal from the buffer location 328. The control signals from each of the buffer locations 322 to 328 correspond to the entry stored within each buffer locations 322-328. For example, the multiplexer 830 receives a control signal from the buffer location 322. In one example, the control signal from the buffer location 322 corresponds to the entry identification associated with the buffer location 316 of the store buffer 310. Accordingly, as each of the vectors 610, 710, and 720 are sorted based on the store buffer 310, the multiplexer 830 selects the third combined signal received at input 2 to output. The third combined signal is output from the multiplexer 830, decoded, or partitioned or divided in some other way, such that the respective entries are stored in corresponding vector locations of the sorted vectors $610_s$, $710_s$, and $720_s$. The processor 111 and/or the buffer circuitry 126 decode the combined signal. In the example 900 where the third combined signal corresponds to entries within vector locations 616, $716_1$-$716_N$, and $726_1$-$726_N$, after the third combined signal is decoded, the entry within the vector location 616 is stored within vector location $616_s$, the entries within vector locations $716_1$-$716_N$ are stored in respective ones of the vector locations $716_{s1}$-$716_{1N}$, and the entries within the vector locations $726_1$-$726_N$ are stored in respective ones of the vectors locations $726_{s1}$-$726_{1N}$.

In the above example, the control signal from the buffer location 324 corresponds to the entry identification associated with the buffer location 318 of the store buffer 310. Accordingly, as each of the vectors 610, 710, and 720 are sorted according to the store buffer 310, the multiplexer 832 selects the fourth combined signal received at input 3 to output. The fourth combined signal is output from the multiplexer 832, decoded, or partitioned or divided in some other way, such that the respective entries are stored in corresponding vector locations of the sorted vectors $610_s$, $710_s$, and $720_s$. For example, as the fourth combined signal corresponds to entries within vector locations 618, $718_1$-$718_N$, and $728_1$-$728_N$, after the fourth combined signal is decoded, the entry within the vector location 618 is stored within vector location $618_s$, the entries within vector locations $718_1$-$718_N$ are stored in respective ones of the vector locations $718_{s1}$-$718_{1N}$, and the entries within the vector locations $728_1$-$728_N$ are stored in respective ones of the vectors locations $728_{s1}$-$728_{1N}$.

In the above example, the control signal from the buffer location 326 corresponds to the entry identification associated with the buffer location 314 of the store buffer 310. Accordingly, as each of the vectors 610, 710, and 720 are sorted according to the store buffer 310, the multiplexer 834 selects the second combined signal received at input 1 to output. The second combined signal is output from the multiplexer 834, decoded, or partitioned or divided in some other way, such that the respective entries are stored in corresponding vector locations of the sorted vectors $610_s$, $710_s$, and $720_s$. For example, as the second combined signal corresponds to entries within vector locations 614, $714_1$-$714_N$, and $724_1$-$724_N$, after the second combined signal is decoded, the entry within the vector location 614 is stored within vector location $614_s$, the entries within vector locations $714_1$-$714_N$ are stored in respective ones of the vector locations $714_{s1}$-$714_{1N}$, and the entries within the vector locations $724_1$-$724_N$ are stored in respective ones of the vectors locations $724_{s1}$-$724_{1N}$.

Further, in the above example, the control signal from the buffer location 328 corresponds to the entry identification associated with the buffer location 312 of the store buffer 310. Accordingly, as each of the vectors 610, 710, and 720 are sorted according to the store buffer 310, the multiplexer 836 selects the first combined signal received at input 0 to output. The first combined signal is output from the multiplexer 836, decoded, or partitioned or divided in some other way, such that the respective entries are stored in corresponding vector locations of the sorted vectors $610_s$, $710_s$, and $720_s$. For example, as the first combined signal corresponds to entries within vector locations 612, $712_1$-$712_N$, and $722_1$-$722_N$, after the first combined signal is decoded, the entry within the vector location 612 is stored within vector location $612_s$, the entries within vector locations $712_1$-$712_N$ are stored in respective ones of the vector locations $712_{s1}$-$712_{1N}$, and the entries within the vector locations $722_1$-$722_N$ are stored in respective ones of the vectors locations $722_{s1}$-$722_{1N}$.

Each of the sorted vectors $610_s$, $710_s$, and $720_s$ are versions of a respective one of the vectors 610, 710, and 720 sorted based on age buffer 320. In one or more examples, the vector locations of each the vectors 610, 710, and 720 are provided to the multiplexers 830, 832, 834, 836 without first being combined (e.g., encoded). For examples, the vector locations of each the vectors 610, $710_1$-$710_N$, and $720_1$-$720_N$ are output to the multiplexers 830, 832, 834, 836 during non-overlapping periods for sorting. In other examples, each one of the vectors 610, $710_1$-$710_N$, and $720_1$-$720_N$ are sorted independently from one another using a respective set of multiplexers 830-836. A respective set of the multiplexers 830-836 generates a sorted vector based on the age buffer 320 for each of the vectors 610, $710_1$-$710_N$, and $720_1$-$720_N$ as is described above without generating combined and decoded signals.

The sorted vectors $610_s$, $710_{s1}$-$710_{sN}$, and $720_{s1}$-$720_{sN}$ are stored within respective buffers within the cache memory 118, the buffer circuitry 126, or another memory within the processing system 100.

At 516 of the method 500, a youngest data associated with the load instruction is extracted. The data is part of a data structure that is associated with a youngest entry within the store buffer 310 of FIG. 3 based on the sorted entry identifiers within the age buffer 320 of FIG. 3. The extracted data is stored within a load buffer and used to respond to the load instruction. In one example, each sorted vector $710_s$ (e.g., the sorted mask vector) is compared to the sorted vector $610_s$ (e.g., the sorted address vector) to determine if there is a match. The vector $610_s$ is includes entries that indicate whether or not the address of the load instruction 602 matched the entries within the buffer locations 312-318 of the buffer 310. Accordingly, comparing the vector $610_s$ with the vectors $710_s$ identifies which of the matching mask bytes within the vectors $710_s$ are associated with an address that matches the address of the load instruction 602.

Figure 9:
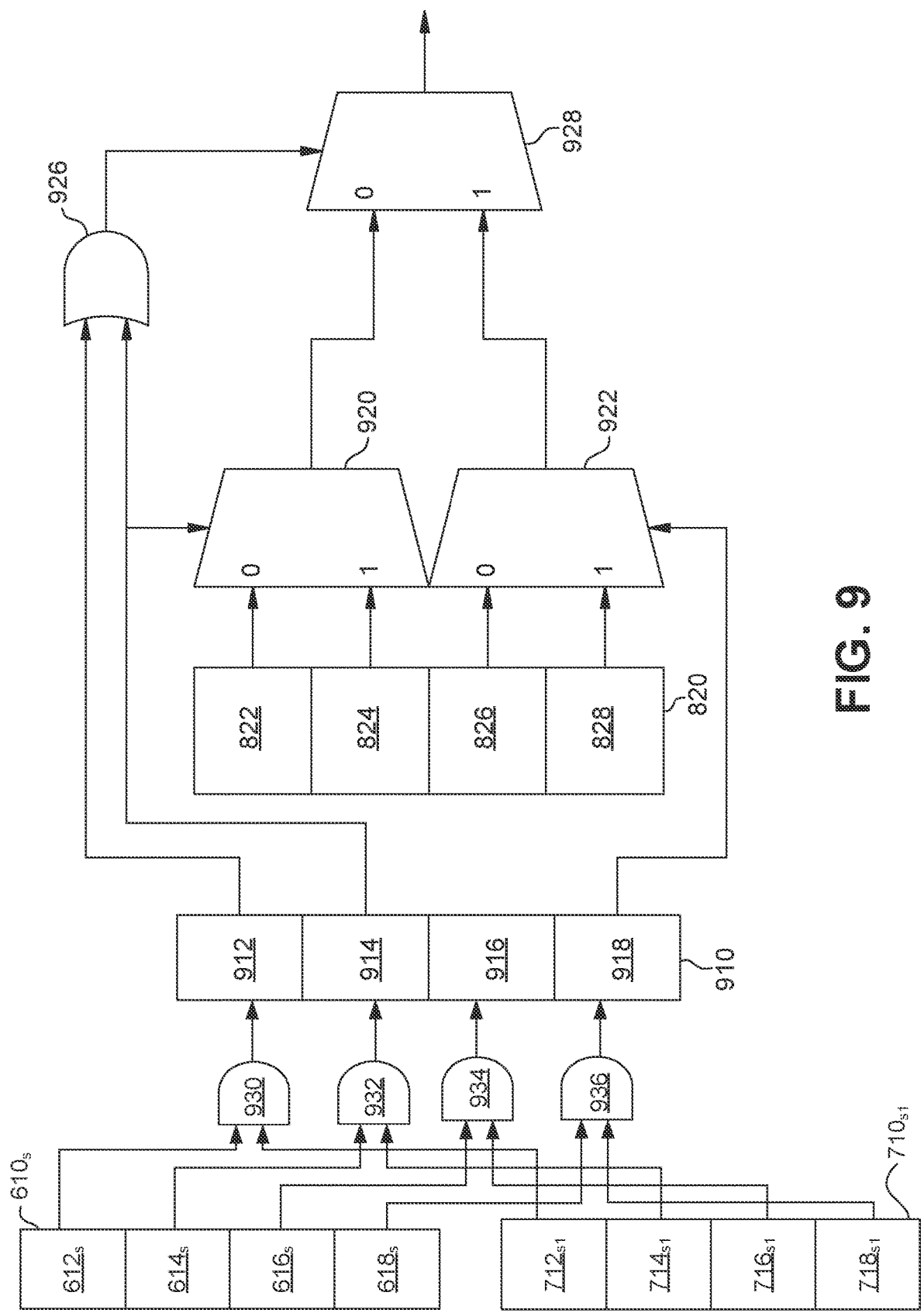
FIG. 9 illustrates the circuitry for extracting data for a load instruction, according to one or more examples.

In the example illustrated in FIG. 9, the sorted vector $610_s$ is compared to the sorted vector $710_{s1}$ using the AND gates 930-936. In other example, other circuit elements may be used to compare the sorted vector $610_s$ with the sorted vector $710_{s1}$. The entry within the vector location $612_s$ and the entry within the vector location $712_{s1}$ are output to the AND gate 930. The entry within the vector locations $612_s$ and $712_{s1}$ is a "1" or "0", accordingly, the AND gate 930 outputs a "1" indicating a match to the vector location 912 of the vector 910 when both the vector locations $612_s$ and $712_{s1}$ have a value of 1. If either of the vector locations $612_s$ and $712_{s1}$ have a value of 0, the AND gate outputs a value of 0 to the vector location 912. Further, the entry within the vector location $614_s$ and the entry within the vector location $714_{s1}$ are output to the AND gate 932. The entry within the vector locations $614_s$ and $714_{s1}$ is a "1" or "0", accordingly, the AND gate 932 outputs a "1" indicating a match to the vector location 914 of the vector 910 when both the vector locations $614_s$ and $714_{s1}$ have a value of 1. If either of the vector locations $614_s$ and $714_{s1}$ have a value of 0, the AND gate outputs a value of 0 to the vector location 914. The entry within the vector location $616_s$ and the entry within the vector location $716_{s1}$ are output to the AND gate 934. The entry within the vector locations $616_s$ and $716_{s1}$ is a "1" or "0", accordingly, the AND gate 934 outputs a "1" indicating a match to the vector location 916 of the vector 910 when both the vector locations $616_s$ and $716_{s1}$ have a value of 1. If either of the vector locations $616_s$ and $716_{s1}$ have a value of 0, the AND gate outputs a value of 0 to the vector location 916. The entry within the vector location $618_s$ and the entry within the vector location $718_{s1}$ are output to the AND gate 936. The entry within the vector locations $618_s$ and $718_{s1}$ is a "1" or "0", accordingly, the AND gate 936 outputs a "1" indicating a match to the vector location 918 of the vector 910 when both the vector locations $618_s$ and $718_{s1}$ have a value of 1. If either of the vector locations $618_s$ and $718_{s1}$ have a value of 0, the AND gate outputs a value of 0 to the vector location 918.

In one example, the entries within the vector locations $612_s$ and $616_s$ have a value of 1, and the entries within the vector locations $614_s$ and $618_s$ have a value of 0. Further, in such an example, the entry within the vector locations $712_{s1}$ and $714_{s1}$ have a value of 1, and the entries within the vector locations $716_{s1}$ and $718_{s1}$ have a value of 0. Accordingly, the AND gate 930 outputs a value of 1 to the vector location 912, and the AND gates 932-936 output values of 0 to the vector locations 914, 916, and 918. The vector 910 is stored within a buffer of the buffer circuitry 126, the cache memory 118, or another memory of the processing system 100.

Figure 6:
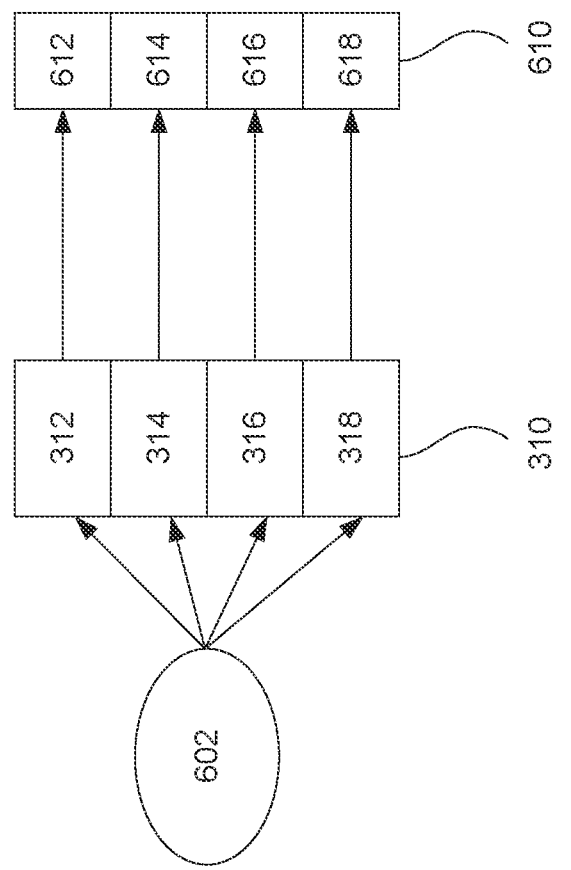
FIG. 6 illustrates an example address vector, according to one or more examples.
Figure 7:
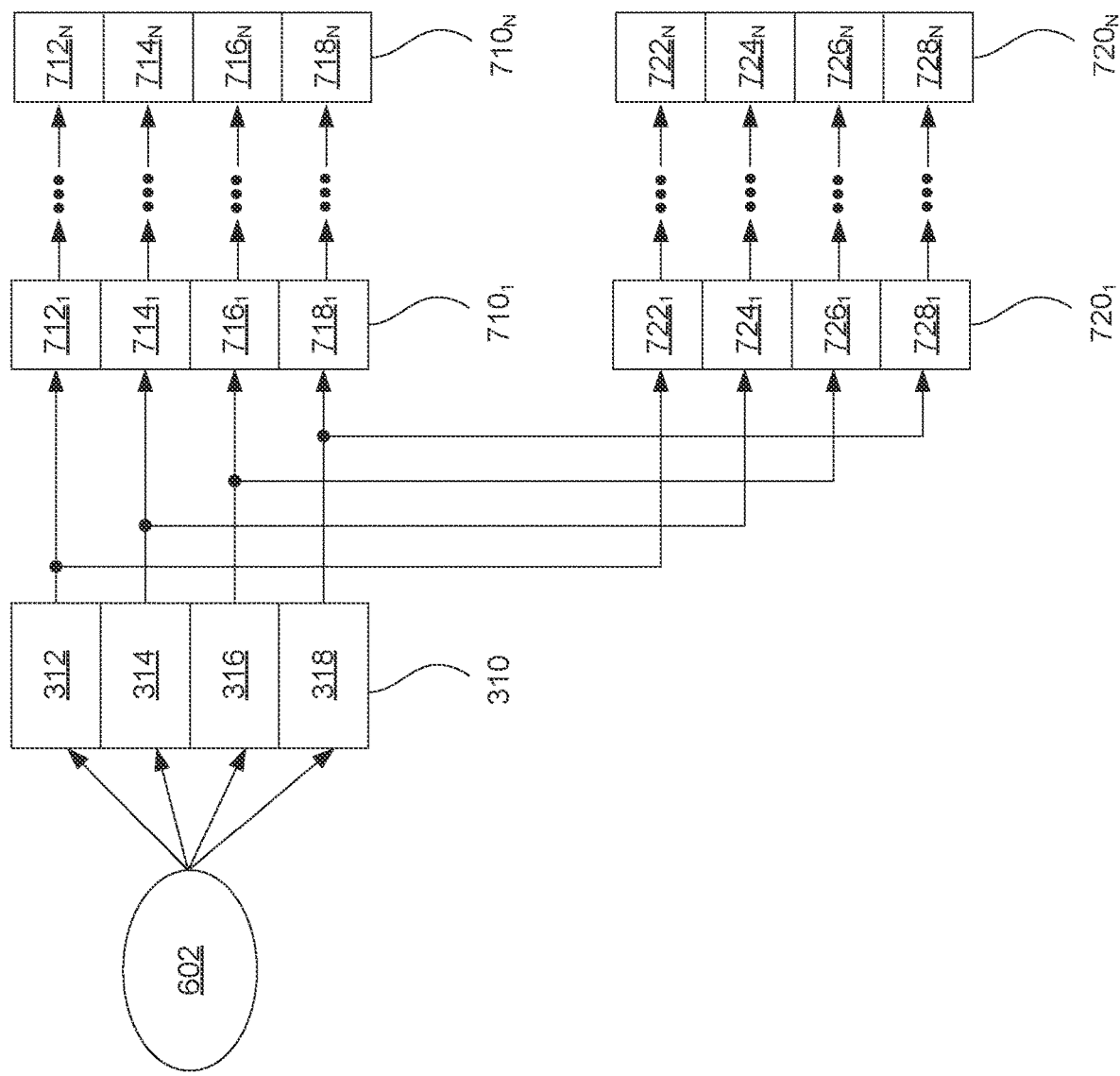
FIG. 7 illustrates example match vectors, according to one or more examples.

The vector 910 is used with the corresponding sorted vector $720_{s1}$ to extract the youngest matching data for a load instruction (e.g., the load instruction 602 of FIG. 6). In one example, the entries of the vector locations 914 and 918 are the control inputs for the multiplexers 920 and 922. The inputs to the multiplexer 920 are the entries of the vector locations $722_{s1}$ and $724_{s1}$, and the inputs to the multiplexer 922 are the entries of the vector locations $726_{s1}$ and $728_{s1}$. Further, the outputs of the vector locations 912 and 914 are combined via the OR gate 924 and provided as a control signal to the multiplexer 926.

The multiplexer 926 outputs the data signal 940 based on the output of OR gate 924. The data signal 940 corresponds to the data stored within one of the vector locations $722_{s1}$-$728_{s1}$ that is associated with a vector locations 912-918 that indicates a match between the vector locations $612_s$-$618_s$ and $712_{s1}$-$718_{s1}$. If multiple matches are determined, the data signal 940 corresponds to a youngest (e.g., newest) one of the entries within the vector locations $722_{s1}$-$728_{s1}$. Based on the example above, the vector location 912 indicates a match (e.g., has a value 1), and the vector locations 914-918 do not indicate a match (e.g., have a value of 0). Accordingly, the multiplexer 920 receives a control signal from the vector location 914 having a value of 0, and selects the entry of the vector location $722_{s1}$ that is connected to input 0 of the multiplexer 920. Further, the multiplexer 922 receives a control signal from the vector location 918 having a value of 0. Accordingly, the multiplexer 922 receives a control signal from the vector location 918 having a value of 0, and selects the entry of the vector location $726_{s1}$ that is connected to input 0 of the multiplexer 922. The multiplexer 926 receives the output of the multiplexer 920 at input 0 and the output of the multiplexer at input 1, and the output of the OR gate 924 as the control signal, and outputs the data signal 940. The data signal 940 is the extracted data that corresponds to a youngest entry within the vector $720_{s1}$ that is associated with a match between the vectors $610_s$ and $710_{s1}$.

The example of FIG. 9 is performed for each of the vectors $710_{s1}$-$710_{sN}$ and $720_{s1}$-$720_{sN}$. Accordingly, the example of FIG. 9 generates N data signals 940. The data signals 940 are stored and output as a response to a load instruction (e.g., the load instruction 602 of FIG. 2). In one example, the data signals are stored within the load buffer as part of stage 228 of the pipeline 117. Further, in other examples, circuit elements other than AND gates may be used to compare the vector locations. Additionally, or alternatively, a different combination of circuitry, different from that of the multiplexers 920, 922 and 926, and the OR gate 924 are used to extract data signals. The circuit example of FIG. 9 illustrates one example, and is not meant to be limiting.

While the above examples are described with regard to buffers and vectors that include four corresponding buffer and vector locations, the examples described above can be applied to buffers and vectors that include more or less than four buffer and vector locations. Further, while various examples in the above are directed to four multiplexers, in other examples, more or less than four multiplexer may be used. The number of multiplexers may correspond to the number of buffer and vector locations within the buffers and vectors.

Figure 10:
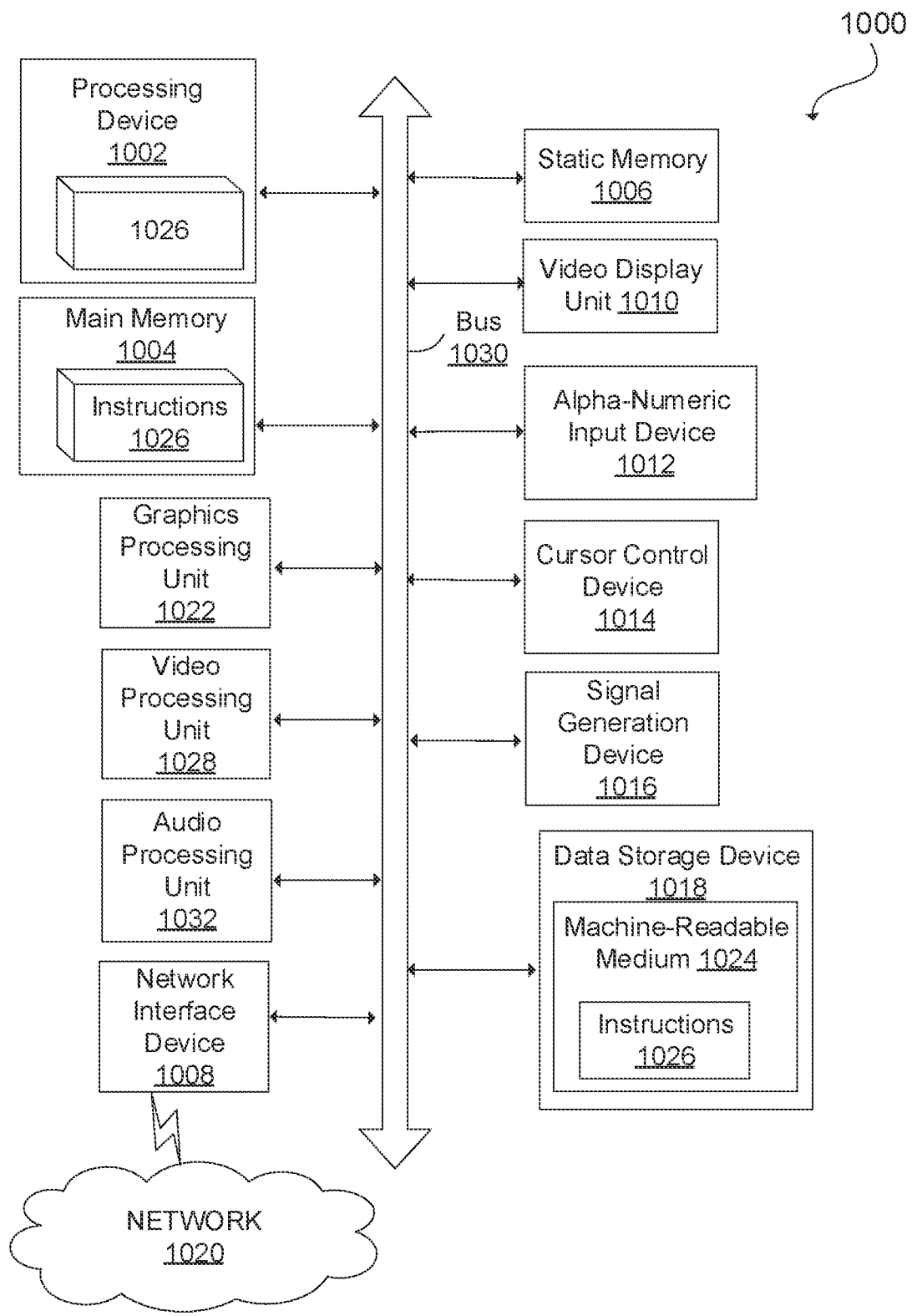
FIG. 10 depicts a diagram of an example computer system in which embodiments of the present disclosure may operate.

FIG. 10 illustrates an example machine of a computer system 1000 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing system 1002, a main memory 1004 (e.g., read-only memory (ROM), flash memory, dynamic random access memory (DRAM) such as synchronous DRAM (SDRAM), a static memory 1006 (e.g., flash memory, static random access memory (SRAM), etc.), and a data storage device 1018, which communicate with each other via a bus 1030.

Processing system 1002 represents one or more processors such as a microprocessor, a central processing unit, or the like. More particularly, the processing system may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing system 1002 may also be one or more special-purpose processing systems such as an application specific integrated circuit (ASIC), a field programmable gate array (FPGA), a digital signal processor (DSP), network processor, or the like. The processing system 1002 may be configured to execute instructions 1026 for performing the operations and steps described herein.

The computer system 1000 may further include a network interface device 1008 to communicate over the network 1020. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), a graphics processing unit 1022, a signal generation device 1016 (e.g., a speaker), graphics processing unit 1022, video processing unit 1028, and audio processing unit 1032.

The data storage device 1018 may include a machine-readable storage medium 1024 (also known as a non-transitory computer-readable medium) on which is stored one or more sets of instructions 1026 or software embodying any one or more of the methodologies or functions described herein. The instructions 1026 may also reside, completely or at least partially, within the main memory 1004 and/or within the processing system 1002 during execution thereof by the computer system 1000, the main memory 1004 and the processing system 1002 also constituting machine-readable storage media.

In some implementations, the instructions 1026 include instructions to implement functionality corresponding to the present disclosure. While the machine-readable storage medium 1024 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing system 1002 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
   receiving a first store instruction, the first store instruction comprising a first target address, a first mask, and a first data structure;
   storing the first target address, the first mask, and the first data structure as a first entry within a first store buffer location of store buffer locations of a store buffer, each of the store buffer locations configured to store a respective entry;
   storing a first entry identification associated with the first store buffer location within a first age buffer location of age buffer locations of an age buffer, each of the age buffer locations configured to store a respective entry identification, wherein an order of the entry identifications within the age buffer locations differs from an order of the entries within the store buffer locations;
   receiving a load instruction comprising a second target address, a second mask, and a second data structure;
   generating an address vector based on the second target address and the first target address and a mask vector based on the second mask and the first mask;
   sorting the address vector and the mask vector based on the age buffer; and
   outputting the first data structure based on the sorted address vector and the sorted mask vector.

2. The method of claim 1, wherein each of the store buffer locations is associated with a respective one of the entry identifications.

3. The method of claim 2, wherein the age buffer locations are configured to store the entry identifications of the store buffer locations.

4. The method of claim 3, wherein the entry identifications stored within the age buffer locations are ordered based on an age of each of the entry identifications.

5. The method of claim 1 further comprising:
receiving a second store instruction, the second store instruction comprising a second target address, a second mask, and a second data structure;
storing the second target address, the second mask, and the second data structure within a second store buffer location of the store buffer; and
storing a second entry identification associated with the second store buffer location within the age buffer, wherein the first entry identification and the second entry identification are ordered within the age buffer based on relative age of the first store instruction and the second store instruction.

6. The method of claim 1 further comprising:
extracting the first data structure based on a comparison between the second target address and the first target address, a comparison between the second mask and the first mask, and based on the sorted address vector and the sorted mask vector.

7. The method of claim 6, wherein
generating the address vector comprises comparing the second target address with a target address within each store buffer location of the store buffer, and
wherein the method further comprises generating mask vectors by comparing the second mask with a mask of each of the store buffer locations, and wherein the mask vectors comprise the mask vector.

8. The method of claim 7, wherein sorting the address vector and the mask vector comprises
ordering the address vector and the mask vectors based on the order of the entry identifications within the age buffer locations of the age buffer.

9. A processing system comprising:
a memory;
a processor configured to access the memory via transactions; and
buffer circuitry comprising a store buffer and an age buffer, the buffer circuitry configured to:
receive a first store instruction, the first store instruction comprising a first target address, a first mask, and a first data structure;
store the first target address, the first mask, and the first data structure as a first entry within a first store buffer location of store buffer locations of the store buffer, each of the store buffer locations configured to store a respective entry; and
store a first entry identification associated with the first store buffer location within a first age buffer location of age buffer locations of the age buffer, each of the age buffer locations configured to store a respective entry identification, wherein an order of the entry identifications within the age buffer locations differs from an order of the entries within the store buffer locations;
receive a load instruction comprising a second target address, a second mask, and a second data structure;

generate an address vector based on the second target address and the first target address and a mask vector based on the second mask and the first mask;
sort the address vector and the mask vector based on the age buffer; and
output the first data structure based on the sorted address vector and the sorted mask vector.

10. The processing system of claim 9, wherein each of the store buffer locations is associated with a respective one of the entry identifications.

11. The processing system of claim 10, wherein the age buffer locations are configured to store the entry identifications of the store buffer locations.

12. The processing system of claim 11, wherein the entry identifications stored within the age buffer locations are ordered based on an age of each of the entry identifications.

13. The processing system of claim 9, wherein the buffer circuitry is further configured to:
receive a second store instruction, the second store instruction comprising a second target address, a second mask, and a second data structure;
store the second target address, the second mask, and the second data structure within a second store buffer location of the store buffer; and
store a second entry identification associated with the second store buffer location within the age buffer, wherein the first entry identification and the second entry identification are ordered within the age buffer based on relative age of the first store instruction and the second store instruction.

14. The processing system of claim 9, wherein the buffer circuitry is further configured to:
extract the first data structure based on a comparison between the second target address and the first target address, and a comparison between the second mask and the first mask, and the sorted address vector and the sorted mask vector.

15. The processing system of claim 14, wherein
generating the address vector comprises comparing the second target address with a target address within each store buffer locations of the store buffer, and
wherein the buffer circuitry is further configured to generate mask vectors by comparing the second mask with the first mask of each of the store buffer locations, and wherein the mask vectors comprise the mask vector.

16. The processing system of claim 15, wherein the buffer circuitry is further configured to:
order the address vector and the mask vectors based on the order of the entry identifications within the age buffer locations of the age buffer.

17. A buffer circuitry configured to:
store first target addresses, first masks, and first data structures of store instructions as entries within buffer locations of a first buffer;
store entry identifications associated with the buffer locations of the first buffer within a second buffer, wherein the entry identifications are ordered based on an age of the store instructions, and an order of the entry identifications within the second buffer differs from an order of the entries within the first buffer;
receive a load instruction, the load instruction comprising a second target address, a second mask, and a second data structure;
generate an address vector based on the second target address with each of the first target addresses and mask vectors based on the second mask with each of the first masks;

order the address vector and the mask vectors based on the order of the entry identifications within buffer locations of the second buffer; and output one of the first data structures based on the ordered address vector and the ordered mask vectors.

18. The buffer circuitry of claim 17, wherein to:

generating the address vector comprises comparing the second target address with each of the first target addresses within the buffer locations of the first buffer; and generating the mask vectors comprises comparing the second mask with the each of the first masks within the buffer locations of the first buffer.

19. The buffer circuitry of claim 17, wherein outputting one of the first data structures is further based on the order of the entry identifications within the second buffer.

20. The method of claim 1, wherein the first mask defines one or more bits to be maintained and one or more bits to be cleared.

* * * * *